C. H. HARRIS.
EXTENSIBLE TABLE.
APPLICATION FILED APR. 18, 1912. RENEWED MAR. 3, 1914.
1,092,045.
Patented Mar. 31, 1914.
6 SHEETS—SHEET 1.
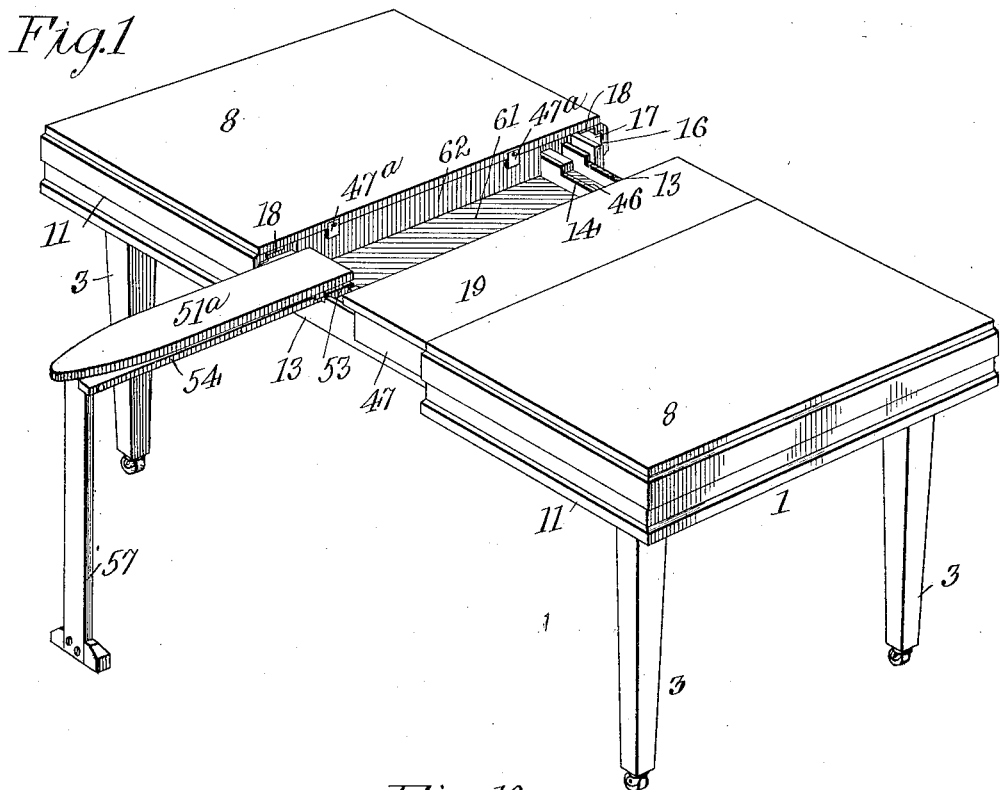
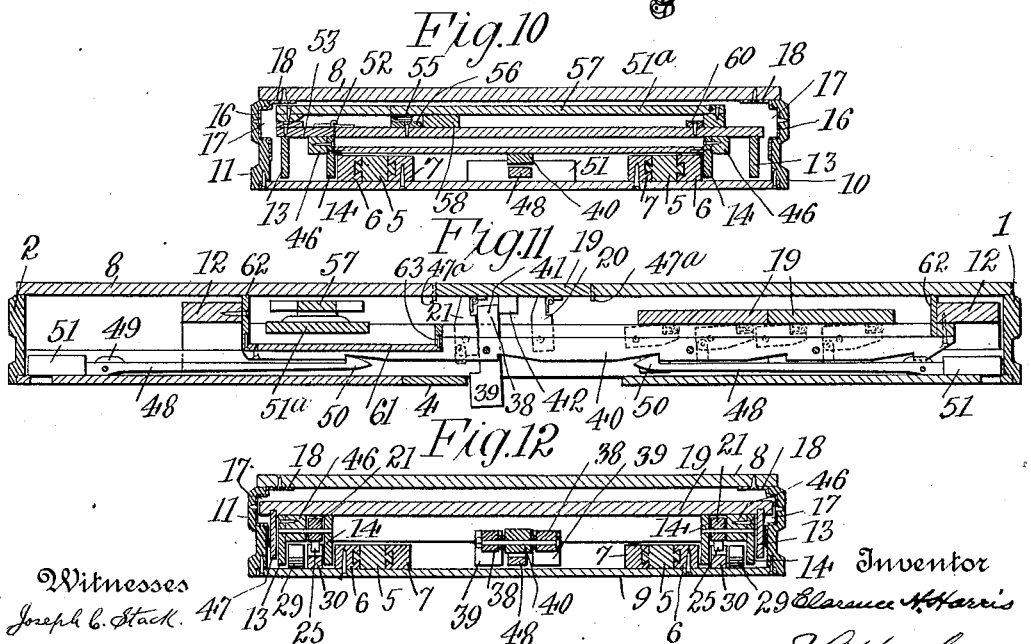

C. H. HARRIS.
EXTENSIBLE TABLE.
APPLICATION FILED APR. 18, 1912. RENEWED MAR. 3, 1914.
1,092,045.
Patented Mar. 31, 1914.
6 SHEETS—SHEET 2.
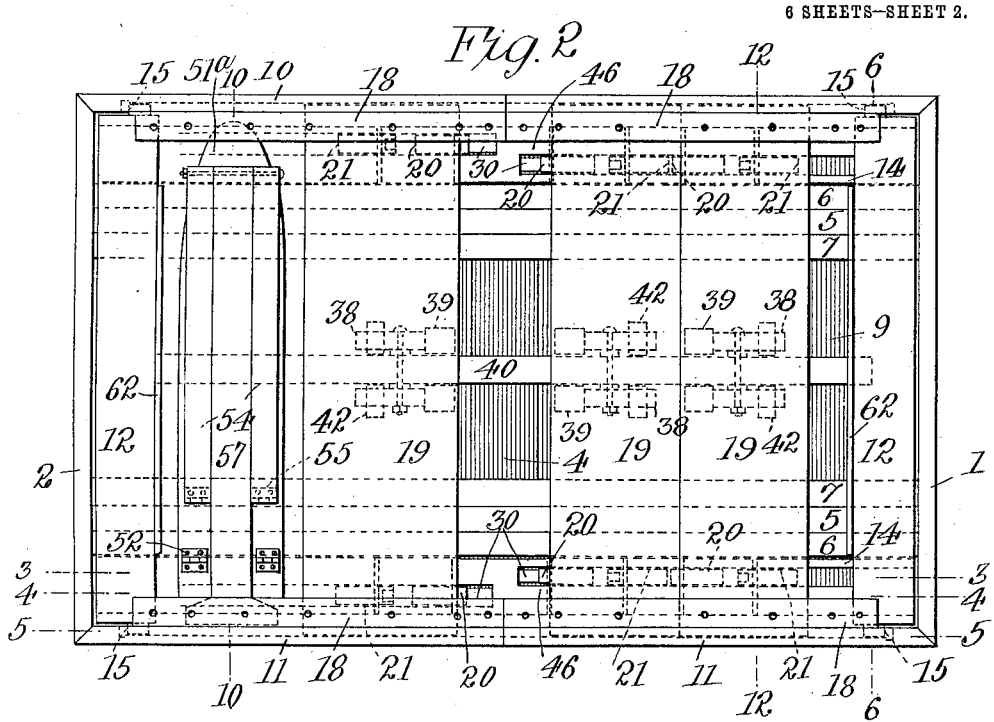
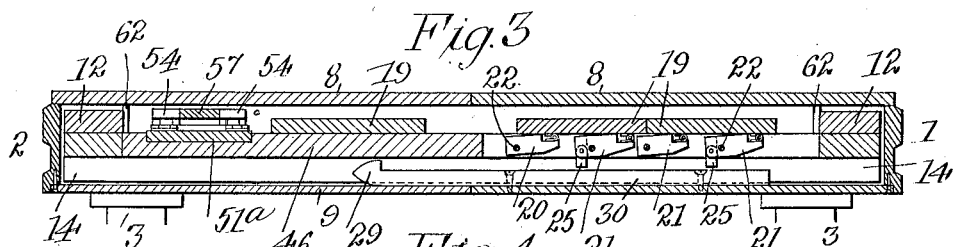
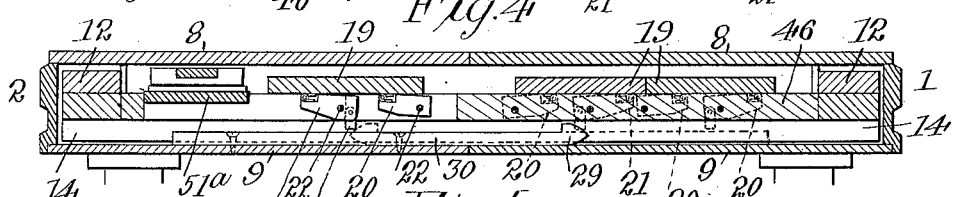
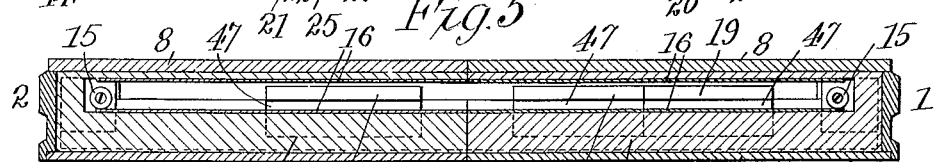

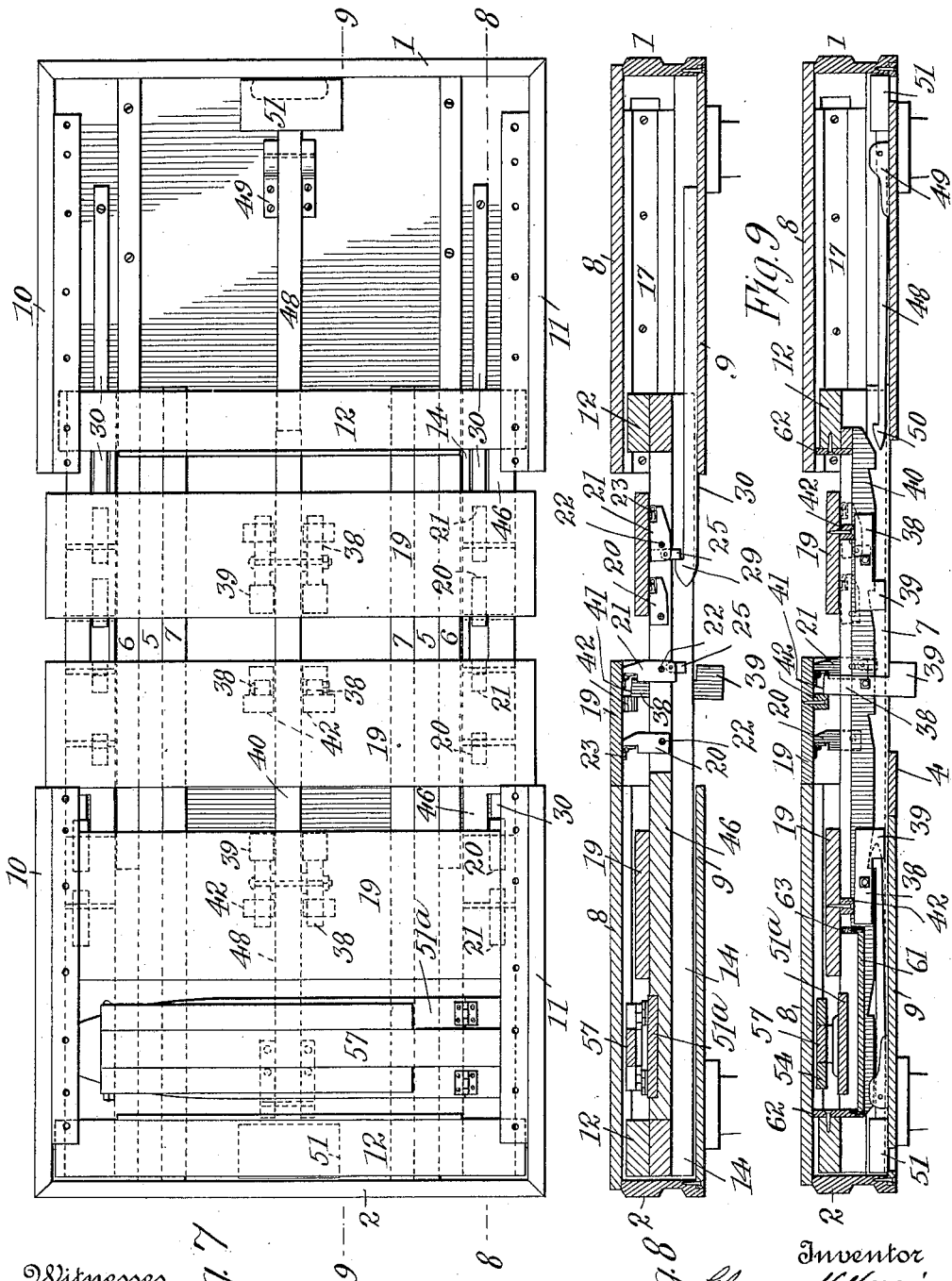

C. H. HARRIS.
EXTENSIBLE TABLE.
APPLICATION FILED APR. 18, 1912. RENEWED MAR. 3, 1914.

1,092,045.

Patented Mar. 31, 1914.
6 SHEETS—SHEET 4.

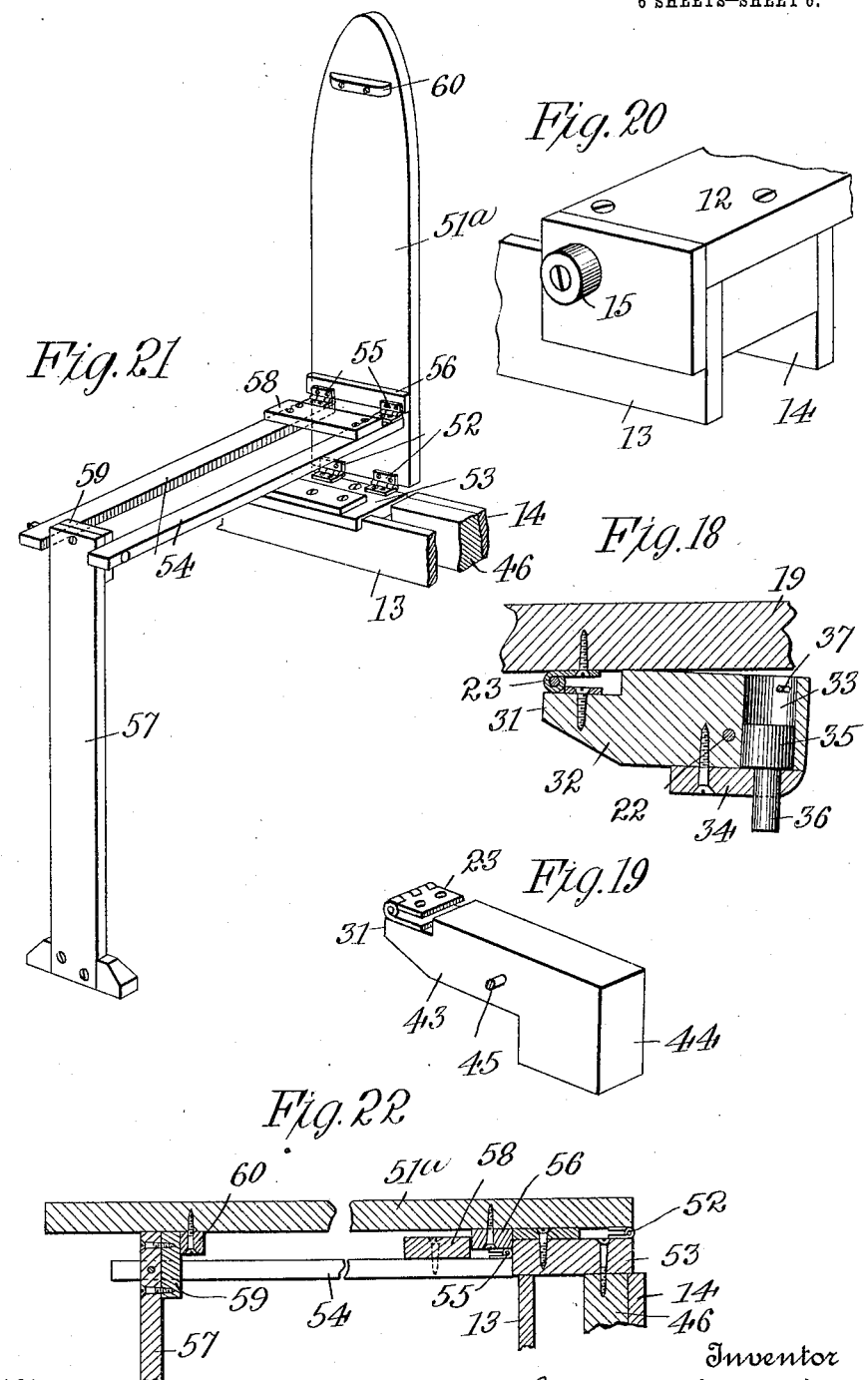

UNITED STATES PATENT OFFICE.

CLARENCE H. HARRIS, OF CHEYENNE, WYOMING.

EXTENSIBLE TABLE.

1,092,045.  Specification of Letters Patent.  Patented Mar. 31, 1914.

Application filed April 18, 1912, Serial No. 691,588.   Renewed March 3, 1914.   Serial No. 822,133.

*To all whom it may concern:*

Be it known that I, CLARENCE H. HARRIS, a citizen of the United States of America, residing at Cheyenne, in the county of Laramie and State of Wyoming, have invented certain new and useful Improvements in Extensible Tables, of which the following is a specification.

The present invention relates to tables, especially tables of the extensible type, and contemplates improvements over the tables of that type disclosed in my co-pending applications Serial Number 656,876, dated October 26th, 1911, and 665,642, dated December 14th, 1911, to wit: (A). The intermediate section or carriage which supports the supplemental table leaves. (B). The mechanism for raising said leaves and supporting the same in elevated position. (C). The type of dog for effecting the lifting operation. (D). The incorporating of the lifting dog and hinge connection for the leaf into one and the same element.

Figure 13:
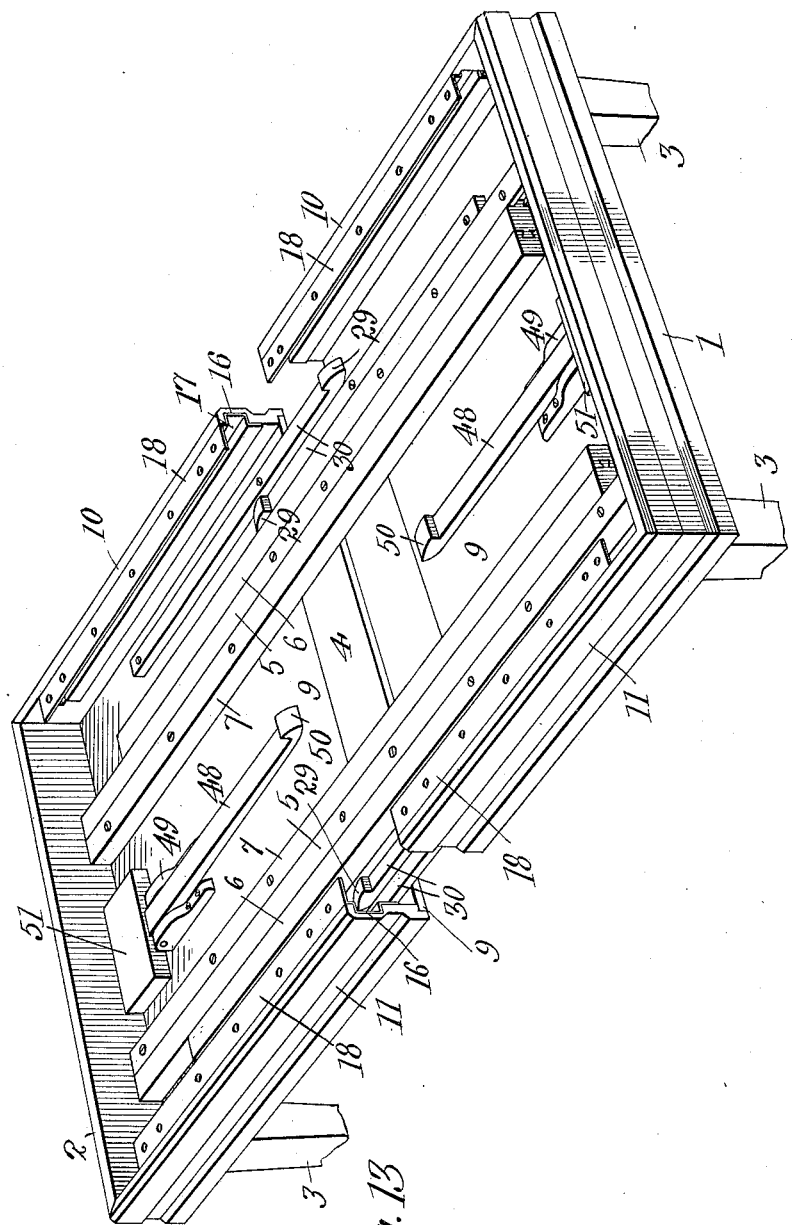
Figure 14:
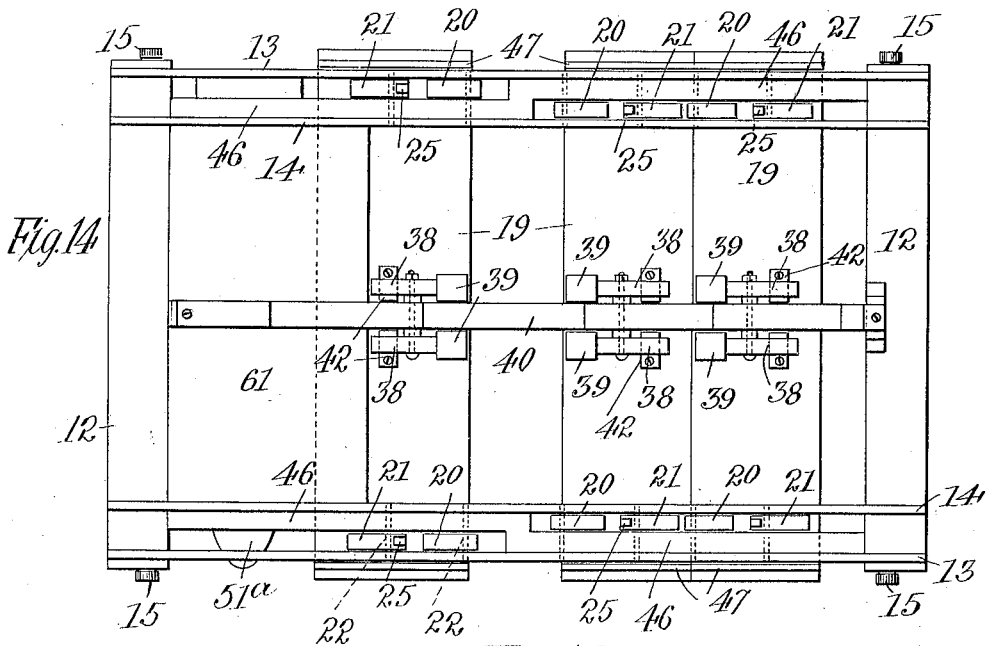
Figure 15:
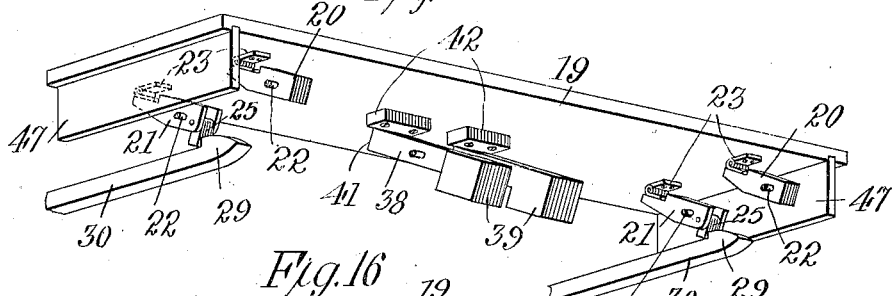
Figure 16:
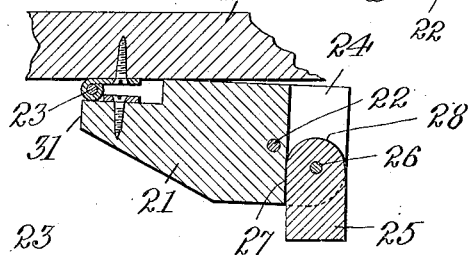
Figure 17:
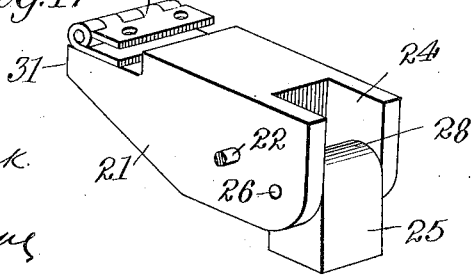

With these and other objects in view, the invention consists in the arrangement and combination of parts hereinafter claimed, and, while the invention is not restricted to the exact details shown and described, still, for the purpose of disclosure, reference is had to the accompanying drawings, in which like reference characters designate the same parts in the several views, and in which, Figure 1 is a perspective view of the table extended, and with the ironing board in position for use; Fig. 2 is a top plan view of the table complete, but with the cover removed; Fig. 3 is a longitudinal sectional view taken on the line 3—3 of Fig. 2; Fig. 4 is a similar view taken on the line 4—4 of Fig. 2; Fig. 5 is a like view taken on the line 5—5 of Fig. 2; Fig. 6 is a transverse sectional view taken on the line 6—6 of Fig. 2; Fig. 7 is a top plan view of the table, with cover removed, and showing the same extended; Fig. 8 is a longitudinal sectional view taken on the line 8—8 of Fig. 7; Fig. 9 is a similar view taken on the line 9—9 of Fig. 7; Fig. 10 is a transverse sectional view taken on the line 10—10 of Fig. 2; Fig. 11 is a longitudinal sectional view of the table, with one leaf in raised position, and disclosing the locking mechanism. Fig. 12 is a transverse sectional view taken on the line 12—12 of Fig. 2; Fig. 13 is a perspective view of the table proper, with the cover and intermediate section removed; Fig. 14 is a bottom plan view of the intermediate section removed; Fig. 15 is an underside perspective view of one of the leaves showing the lifting mechanism in operation; Fig. 16 is a longitudinal sectional view in detail of one of the lifting dogs; Fig. 17 is a detailed perspective view of the lifting dog; Fig. 18 is a longitudinal sectional view of a modified type of lifting dog; Fig. 19 is a detailed perspective view disclosing the weighted hinge which may be employed; Fig. 20 is a perspective of a detail of the carriage or intermediate section, showing the roller bearing therefor; Fig. 21 is a perspective view of the ironing board attachment; and Fig. 22 is a longitudinal sectional view disclosing the ironing board when in position for use.

Referring to the construction in further detail, the table consists of two main or end sections 1 and 2 (see Figs. 7, 11 and 13) having the usual supporting legs 3, and are adjustably connected together through the medium of any appropriate form of runners. In the present instance, these runners consist of a central cross piece 4 that has rigidly attached thereto, at either end, a strip 5. The strips 5 are provided with flanges that enter into grooves formed in the sides of strips 6 and 7 that are secured respectively to the end sections 1 and 2. The foregoing described construction is substantially the same as that disclosed in the table construction identified in the above-mentioned applications and, as stated therein, this arrangement avoids the use of the usual central leg for the table.

Each of the end sections 1 and 2 is constructed with a top 8 and a bottom 9, which, with the side pieces 10 and 11, provide the necessary space for containing the central table section or carriage (see Figs. 3, 4 and 14) on which the several extra or auxiliary leaves are mounted.

The central table section consists of a frame comprising end pieces 12 connected together, and at either end, by a pair of side strips 13 and 14. Said intermediate table section is provided at the four corners thereof with rollers 15 suitably journaled to the ends of the members 12, and which are adapted to ride within the channels 16 formed lengthwise in the side members 10 and 11, and in which position said rollers support the intermediate table section sufficiently above the bottom members 9 to avoid friction, as clearly illustrated in Fig. 6. The channels 16 are lined with sheet metal 17, which gives a smooth or anti-friction surface for the rollers 15, and does further reinforce the table sides 10 and 11. The metal sheets or strips 16 are turned inwardly along the upper edges to provide flanges or supporting members 18 for securing the table tops 8 of the end sections (see Fig. 6).

The extra or auxiliary leaves 19 are arranged in opposed sets on the intermediate section, and are supported thereon through the medium of a pair of dogs 20 and 21 disposed at either end of each leaf. Said dogs 20 and 21 are mounted on pivots 22 between the side strips 13 and 14, and are each connected with the underside of their respective leaf 19 through the medium of an ordinary hinge 23.

The dogs 21 serve, in addition to their function of supporting the leaves in the plane of the table top, to assist in the lifting operation of said leaves. To this end each dog 21 is bifurcated at its free end 24 to receive a toggle 25 which is pivotally mounted within said bifurcation on the pin 26. Said toggle is mounted in such relation to the dog 21 that the portion 27 of the dog acts as a shoulder and prevents the toggle having turning movement in one direction with said dog, but said toggle is permitted to turn in the reverse direction by having a rounded surface 28.

In operation, the pair of toggles 25 on each leaf are engaged by the hooked ends 29 of the bars 30, of which there is one pair carried by each of the sections 1 and 2, and through the movement of said bars said toggles abut against the shoulders 27 and cause the dogs 21 to turn on their pivots 22, and this operation effects the raising of the table leaf in substantially that manner shown in Fig. 15. On the reverse movement of the bars 30 (i. e., when the table is closed), the hooked ends 29 are permitted to freely pass the toggles 25 since said toggles are free to turn in the direction to that opposite for the lifting action, as above explained. The upper ends 31 of the lifting dogs 20 and 21 are squared whereby said dogs afford an even supporting surface for the table leaf when in raised position (see Figs. 8 and 11).

A modified construction of lifting dog and toggle therefor is illustrated in Fig. 18. In this arrangement, the dog 32 has a cylindrical recess 33 closed by a member 34 to provide a limited working space for the head 35 of a weight, and which weight has a stem 36 projecting through an opening in the member 34. With this form of lifting dog and toggle, the stem 36 is adapted to be engaged by the hooked end 29 of the bar 30 when said bar moves in one direction, and by such movement the dog 32 is caused to turn on its pivot 22. On the reverse movement of the bar 30, the inclined surface of the hooked end 29 engages with and lifts the weight, and such lifting movement is limited by the stop or pin 37.

It is proposed, in this type of table, to assist the lifting operation of the table leaves by a mechanical device to the end of easy movement of the table end sections, and the preferred means for accomplishing which is disclosed in Figs. 14 and 15. Said means consists in a pair of levers 38, each having a weighted end 39, and pivotally mounted on the bar 40 which is secured to the end members 12 of the intermediate table section. The free ends 41 of the levers 38 are adapted to have frictional engagement with the underside of the table leaves as said leaves are lifted, and through the weights 39 said levers effect to raise said leaves bodily and thus to produce the lifting of the table leaves by substantially the normal extension movement of the table. The closing or lowering of the table leaves is effected merely by throwing the dogs 20 and 21 off center, and, in so doing, a pair of blocks 42 carried by each leaf engages with the free ends 41 of the weighted levers and effects to turn said levers on their pivots into a horizontal position, as clearly shown in Fig. 9.

An alternative construction for the weighted lever is illustrated in Fig. 19 wherein it is proposed to incorporate in a single member a lifting dog 43 having a weighted end 44, and which is mounted on the pivot pin 45 between the two strips 13 and 14 as, with the lifting dogs now shown therein. With this arrangement it is proposed to eliminate the mounting of a separate or independent weight or weights, as indicated in Figs. 14 and 15.

In the table constructions disclosed in the foregoing mentioned applications, it is characteristic that a plurality of channelways are disposed to either side of the central frame for containing the mechanism which lifts and supports the several table leaves. The present construction, it will be noted, embodies but a single channelway to either side of the intermediate section, and, in this respect, the present invention is believed to mark a well advanced step in the art of automatic extensible tables. With this arrangement it becomes necessary that the lifting dogs of the respective sets of leaves of the intermediate section be located within the paths of their respective actuating members 30, and to which end the dogs 20 and 21 of each set of leaves are arranged in the same alinement. This arrangement is effected by a spacing strip 46 which is located in such manner between the strips 13 and 14 that the dogs of one set of leaves are disposed in offset relation with respect to the dogs of the opposite set of leaves.

The table leaves are each provided with downwardly disposed side flanges 47 secured at either end of each leaf, and which have for their purpose to conceal the inner mechanism of the table when said leaves are in raised position in that manner clearly indicated in Fig. 1. When the several leaves are in closed position, i. e., when the table is collapsed, the projecting edges of the several leaves are adapted to move within the metal lined guideways 17. In this respect the table leaves are identical with the similar parts in the table constructions heretofore referred to.

The intermediate table section used in the present construction has the function of a carriage in that it is free to move relatively to the table end sections 1 and 2, as distinct from being secured therebetween, as in the table constructions above referred to. The end sections are provided with stops 47$^a$ adapted to engage respectively with the end cross pieces of the carriage, and thus serve to limit the outward pull of said end sections.

A locking mechanism is provided in the present table construction, and is identical with the locking mechanism in the table constructions referred to. Said construction consists of a bar 48, for each end section, pivotally mounted on cleats 49, and has hooked or engaging ends 50 that are normally held in operative position through the medium of weighted ends 51 (see Figs. 11, 13 and 14). The engaging ends 50 of said bars are adapted to coöperate with the notched bar 40 that is secured to the intermediate table section.

The ironing board attachment with which it is proposed to equip the table consists of the ironing board *per se* 51$^a$ (see Figs. 21 and 22) secured by hinges 52 to a block 53 on one side of the table. The board 51$^a$ is adapted to be held in position for use through the medium of a frame, which frame, when not in position for use, is adapted to be folded within the table (see Figs. 7, 10 and 11). The frame consists of a pair of spaced strips 54 connected by hinges 55 to a strip 56 attached to the underside of the board 51$^a$, and at the opposite end said members 54 are pivotally secured to a leg 57. It is proposed to hold the board 51$^a$ sufficiently spaced from the strips 54 to permit of the usual covering for the board and, to this end, the strips 54 have a block 58 that coöperates with the projecting end 59 of the leg 57 to serve as the spacing members. The board 51$^a$ has secured thereon a cleat 60 that engages against the projecting end of the leg 57 and holds said board steady. The members 56 and 58 do likewise coöperate to hold the board steady, as illustrated in Fig. 22. When in closed position, the leg 57 is adapted to fold between the two strips 54 and said strips and the leg are adapted to fold against the underside of the board 51. In this relation the three elements 51$^a$, 54 and 57 are adapted to be contained or housed within a suitable inclosure with which the intermediate table section is provided. Said inclosure consists of a bottom member 61 and side pieces 62 and 63 secured thereon (see Figs. 1 and 11).

It is obvious that those skilled in the art may vary the details of construction and arrangement of parts without departing from the spirit of my invention, and, therefore, I do not wish to be limited to such features except as may be required by the claim.

I claim—

In an extensible table the combination of a main body comprising relatively movable end sections; an intermediate section located between said end sections; said intermediate section comprising a single pair of spaced strips disposed on either side thereof; spacing strips secured between each pair of said strips providing off-set channels; dogs pivotally mounted within said channels; supplemental table leaves hingedly connected to said dogs; toggles loosely mounted on a pair of the dogs of each supplemental table leaf; and devices carried by each of said end sections for engaging with said toggles to turn the dogs for lifting said supplemental table leaves when the table is extended, substantially as described.

In testimony whereof I affix my signature in presence of two witnesses.

CLARENCE H. HARRIS.

Witnesses:
H. H. BYRNE,
C. E. BRECKONS.

---

Copies of this patent may be obtained for five cents each, by addressing the "Commissioner of Patents, Washington, D. C."